United States Patent [19]
Oyama et al.

[11] Patent Number: 5,574,365
[45] Date of Patent: Nov. 12, 1996

[54] TRAVEL SENSOR HAVING A MAGNETIC SENSOR ATTACHED TO A TRUNCATED PYRAMID AND A MOVABLE MAGNET

[75] Inventors: Hitoshi Oyama; Masahiro Kume, both of Itami, Japan

[73] Assignee: Sumitomo Electric Industries, Ltd., Osaka, Japan

[21] Appl. No.: 361,223

[22] Filed: Dec. 21, 1994

[30] Foreign Application Priority Data

Oct. 14, 1994 [JP] Japan ................................. 6-248988

[51] Int. Cl.$^6$ .............................. G01B 7/14; G01D 5/18; G01R 33/02
[52] U.S. Cl. .............................. 324/207.24; 324/207.22; 324/207.21
[58] Field of Search ........................... 324/207.2, 207.21, 324/207.22, 207.24, 173, 174, 235, 251, 252; 338/32 H, 32 R

[56] References Cited

U.S. PATENT DOCUMENTS 5,115,186  5/1992  Reinartz et al. .

FOREIGN PATENT DOCUMENTS

| 0325787 | 8/1989 | European Pat. Off. . | |
|---|---|---|---|
| 0180416 | 7/1989 | Japan | 324/207.24 |
| 2-75901 | 3/1990 | Japan . | |
| 2272060 | 5/1994 | United Kingdom . | |

OTHER PUBLICATIONS

Patent Abstracts of Japan, vol. 00, No. 00, Mar. 28, 1995.

*Primary Examiner*—Walter E. Snow
*Attorney, Agent, or Firm*—Wenderoth, Lind & Ponack

[57] ABSTRACT

A movement distance detector which is simple in structure, low-cost and highly accurate. The detector includes a magnet movable along a path, a magnetic body arranged along the path, and a magnetically sensitive element attached to one end of the magnetic body. When the magnet is moved along the path, a magnetic circuit is formed by the oppositely arranged magnet and magnetic body. The number of magnetic fluxes focused by the magnetic body changes with the movement distance of the magnet. The magnetically sensitive element detects the change in number of magnetic fluxes, that is, the movement distance. The magnetic body may be a rod, a truncated pyramid or a cylinder.

7 Claims, 8 Drawing Sheets

Gap: □ 4 mm  ● 6 mm  ◇ 8 mm
△ 10 mm  × 12 mm  ▽ 14 mm

Gap: ☐ 4 mm   ● 6 mm   ◇ 8 mm
△ 10mm   × 12mm   ▽ 14mm

Gap: □ 4 mm ● 6 mm ◇ 8 mm
△ 10 mm × 12 mm ▽ 14 mm

Gap : □ 4 mm ● 6 mm ◇ 8 mm
△ 10 mm × 12 mm ▽ 14 mm

Gap: □ 4 mm ● 6 mm ◇ 8 mm
△ 10 mm × 12 mm ▽ 14 mm

Gap: □ 4 mm  ● 6 mm  ◇ 8 mm
△ 10 mm  × 12 mm  ▽ 14 mm

Gap: □ 4 mm  ● 6 mm  ◇ 8 mm
△ 10mm  × 12mm  ▽ 14mm

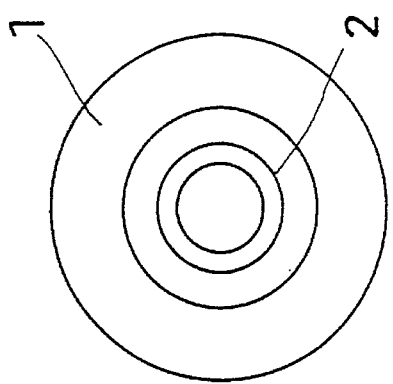
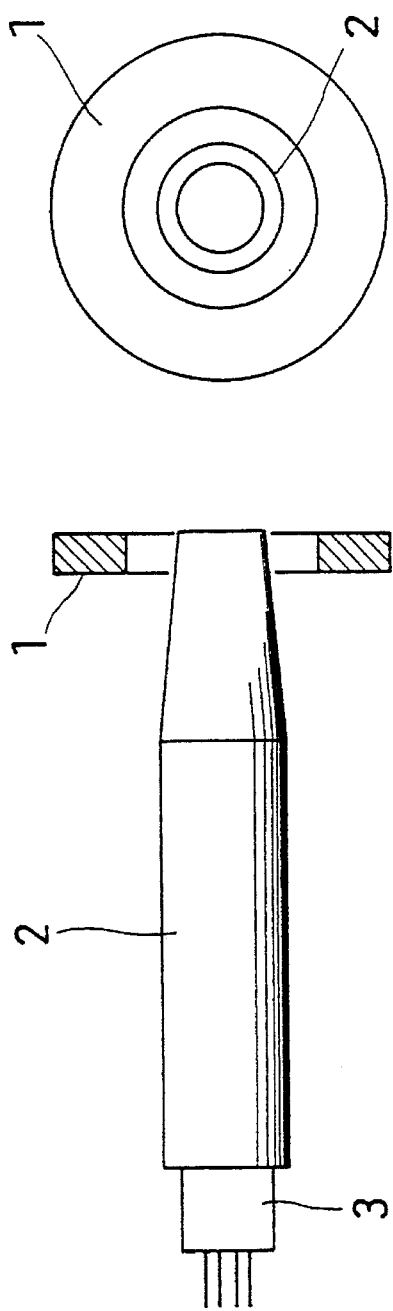
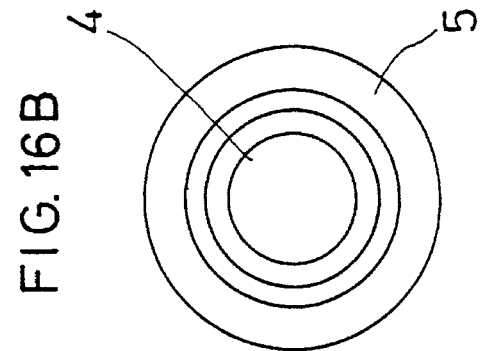
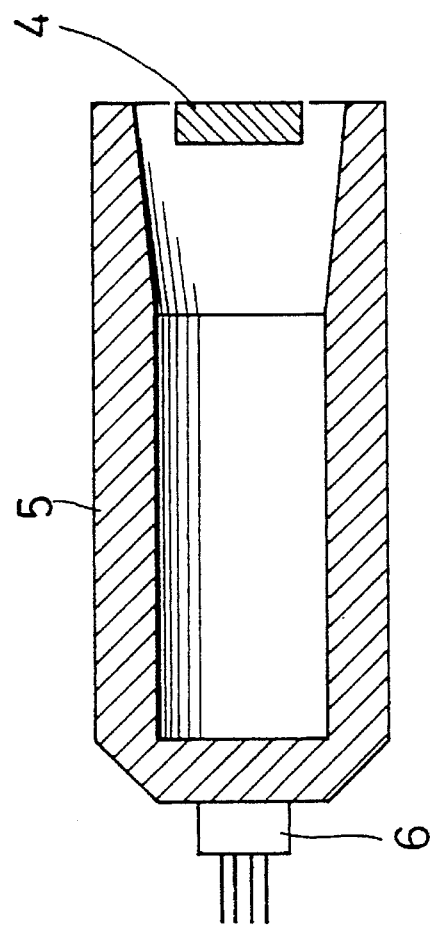

TRAVEL SENSOR HAVING A MAGNETIC SENSOR ATTACHED TO A TRUNCATED PYRAMID AND A MOVABLE MAGNET

BACKGROUND OF THE INVENTION

This invention relates to a movement distance detector for detecting the amount of movement of an object.

Various such movement distance detectors have been proposed.

For example, a movement distance detector disclosed in Unexamined Japanese Patent Publication 2-302611 is used to measure the movement of an automotive brake pedal.

This movement distance detector has a piston supported in a cylinder through a first compression spring and coupled to a brake pedal through a second compression spring. The first compression spring is more rigid than the second one, so that the pedal stroke applied to the piston through the second compression spring is shortened by the more rigid first compression spring. The thus shortened stroke pedal is detected by a detector. In other words, the relatively large pedal stroke is detected by measuring the shortened stroke of the piston.

In this arrangement, since the pedal stroke is detected in the form of shortened stroke of the piston, the resolution of detection is poor. Also, since springs are used to shorten stroke, responsiveness is not good.

Also in this arrangement, the detection accuracy is determined by the rigidity ratio between the first and second compression springs. Thus, it is difficult to adjust the accuracy with high reproducibility. Also, spring rigidities tend to change with time. This can cause detection errors.

A suspension stroke sensor disclosed in Unexamined Japanese Utility Model Publication 2-82604 is free of these problems. It has a sheath member mounted on a piston rod of a cylindrical shock absorber and having an outer periphery tapered in the axial direction of the piston rod. A gap sensor which utilizes high-frequency induction or electrostatic induction is mounted on the cylinder opposite the tapered surface of the sheath member so that the distance between the tapered surface of the sheath member and the gap sensor will change linearly with the piston stroke. Since this distance is directly converted into the stroke of the piston rod, the stroke can be detected with high response, accuracy and reproducibility. Also, measured values are less likely to change with time.

The detection accuracy of this suspension stroke sensor depends largely upon the dimensional accuracy of the sheath member. Thus, the sheath member has to be machined with a high degree of accuracy. This results in a rather high production cost of the entire device.

An object of this invention is to provide a movement distance detector which is simple in structure and thus can be manufactured at low cost, which can detect the movement of an object with high responsiveness, accuracy and reproducibility and which will maintain high levels of performance over time.

SUMMARY OF THE INVENTION

According to this invention, there is provided a movement distance detector comprising a magnet movable along a path, a magnetic body, and a magnetically sensitive element mounted on the magnetic body. The magnetic body includes a portion extending along the path and located proximate to the magnet.

The magnet may have its poles arranged parallel to the path. The magnetic body may be in the form of a rod extending parallel to the path. In this arrangement, the magnetically sensitive element is attached to one end of the magnetic body.

Also, the magnet may have its poles arranged perpendicular to the path. The magnet may have a length substantially equal to the relative movement distance between the magnetic body and the magnet.

In another arrangement, the magnet has its poles arranged parallel to the path, while the magnetic body has the shape of a truncated pyramid having a bottom surface arranged opposite to the magnet. The magnetically sensitive element is mounted on the top of the truncated pyramid.

In the present invention, a magnetic circuit is formed by the magnetic body and the magnet opposed to each other. The magnetic fluxes produced by the magnet are focused by the magnetic body.

The number of fluxes of the magnet that are focused by the magnetic body changes with the relative distance between the magnetically sensitive element and magnet. Thus, the relative position between the magnetic body and the magnet can be detected by the magnetically sensitive element attached to the magnetic body.

The magnetic body has a portion that extends along a path of the magnet and is located proximate the magnet to form a magnetic circuit along the magnet path. Thus, the sensitivity distribution of the magnetically sensitive element improves along the magnet path.

With this arrangement, since the magnetic fluxes that move relatively along the magnet path are focused by the magnetic body, the sensitivity of the magnetically sensitive element increases and thus its resolution improves.

In an arrangement in which the magnet has its poles arranged parallel to the magnet path and in which the magnetic body is in the form of a rod that extends parallel to the magnet path and carries the magnetically sensitive element at one end, the magnet produces magnetic fluxes that run parallel to the magnet path.

With this arrangement, the rod-shaped magnetic body extending parallel to the magnet path, is located inside the magnetic fluxes, which also extend parallel to the magnet path. Thus, due to its self-demagnetizing force, the fluxes of the magnet are focused into the rod-shaped magnetic body. The magnetic flux density thus increases.

The magnetically sensitive element which is mounted on one end of the magnetic body detects the magnetic flux density at the end or interface of the magnetic body, where the magnetic fluxes are focused and the flux density is the highest. Thus, the sensitivity and movement resolving power improve.

Similarly, in the arrangement in which the poles of the magnet are arranged perpendicular to the magnet path, it is also possible to measure the amount of movement.

Further, in the arrangement in which the magnet has a length substantially equal to the distance of relative movement between the magnetic body and the magnet, the magnetic fluxes produced at the portion of the magnet overlapping with the magnetic body are focused by the magnetic body and detected by the magnetically sensitive element. Thus, the detected values change in proportion to the area of the portion of the magnet which overlaps with the magnetic body, i.e. the amount of relative movement between the magnet and the magnetic body, so that the movement of an object can be detected accurately.

In the arrangement in which the poles of the magnet are arranged parallel to the magnet path, in which the magnetic body has a truncated pyramid shape having a bottom surface located opposite to the magnet, and in which the magnetically sensitive element is mounted on the top of the truncated pyramid, the magnetic fluxes of the magnet focused on the bottom surface of the truncated pyramid are guided to the end face of the top of the truncated pyramid.

If, in this arrangement, the direction in which the magnetically sensitive element, mounted on the top of the truncated pyramid, detects the magnetic field is arranged e.g. perpendicular to the magnet path, it detects the vertical component of the magnetic fluxes directed from the north pole of the magnet toward its south pole, i.e. the magnetic fluxes directed from the north pole of the magnet toward the magnetic body and the magnetic fluxes directed from the magnetic body toward the south pole of the magnet.

Thus, when the magnet is located at the center of the bottom surface of the magnetic body, the magnetically sensitive element detects the magnetic fluxes of the same number but in opposite directions. Since such magnetic fluxes negate each other, no output will be produced.

On the other hand, while the magnet is located at either end of the bottom surface of the magnetic body, the magnetic body can focus only the magnetic fluxes in one direction. Thus, the output corresponding to the fluxes in one direction is produced.

While the magnet is located somewhere between the center and either end of the bottom surface, the magnetically sensitive element will produce an output corresponding to the difference between the magnetic fluxes in opposite directions focused by the magnetic body.

In the arrangement in which the magnet has its poles arranged perpendicular to the magnet path and has a length substantially equal to its moving distance, only the magnetic fluxes directed from the north to south poles are detected.

Namely, the magnetic fluxes produced by the portion of the magnet overlapping with the magnetic body are detected by the magnetically sensitive element. Thus, it is possible to detect the relative movement between the magnet and the magnetic body by detecting the magnetic flux density which changes with the area of the overlapping portion between the magnet and the magnetic body.

Other features and objects of the present invention will become apparent from the following description made with reference to the accompanying drawings, in which:

BRIEF DESCRIPTION OF THE DRAWINGS

FIG. 15A is a partially sectional side view of an eighth embodiment;

FIG. 15B is a front view of the embodiment illustrated in FIG 16A;

FIG. 16A is a partially sectional side view of a ninth embodiment; and

FIG. 16B is a front view of the embodiment illustrated in FIG. 16A.

DETAILED DESCRIPTION OF THE PREFERRED EMBODIMENT

Figure 1:
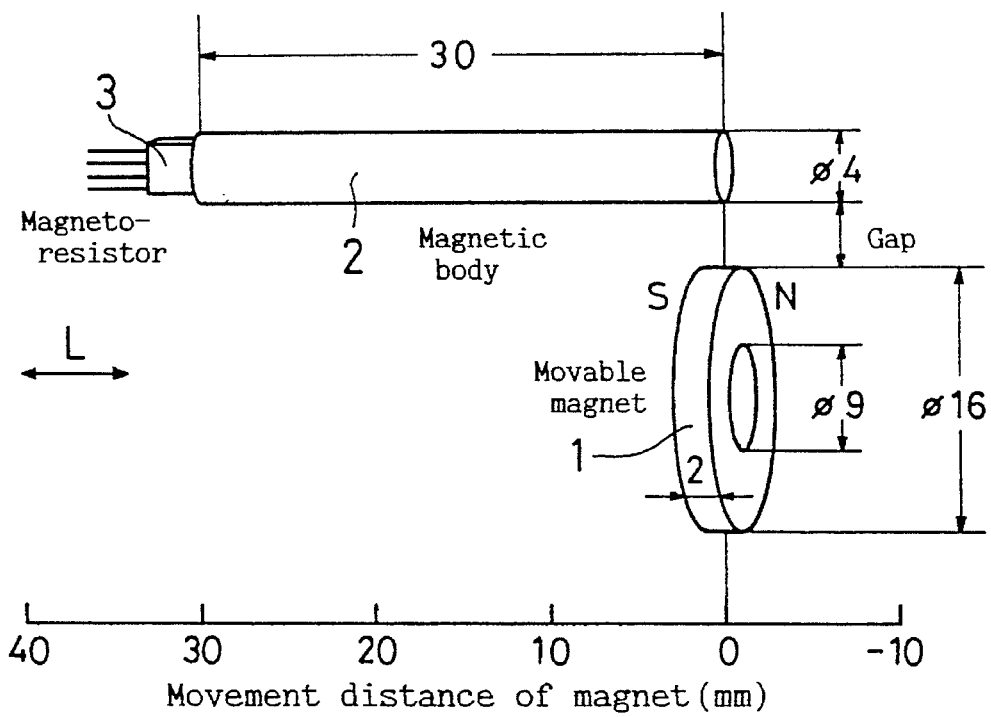
FIG. 1 is a schematic view of a first embodiment.

Now referring to the drawings, we will describe embodiments of the invention.

FIG. 1 shows the first embodiment of the movement distance detector according to the present invention.

The movement distance detector of the first embodiment comprises a ring magnet 1 movable along a path L and having an axis extending parallel to the path L, a rod-shaped magnetic body 2 arranged parallel to the axis of the movable magnet 1 and along the path L, and a magnetically sensitive element 3 attached to one end of the magnetic body 2.

The magnet 1 is made of SmCo and has an inner diameter of 9 mm, an outer diameter of 16 mm and a thickness of 2 mm and has magnetic poles N, S arranged in parallel to the path L.

The magnetic body 3 is made of S45C steel and measures 4 mm in outer diameter and 30 mm in length.

The magnetically sensitive element 3 of this embodiment is a magneto-resistor that internally forms a full bridge. It is mounted so that its detection surface is in contact with an end face of the magnetic body 2.

Thus, the direction in which the magneto-resistor 3 detects the magnetic field coincides with the direction of the path L.

A magnetic circuit is formed by the oppositely arranged magnetic body 2 and magnet 1. The magnetic body 2 focuses magnetic fluxes produced by the magnet 1 and extending parallel to the path L.

The number of magnetic fluxes focused by the magnetic body 2 depends upon the distance between the magneto-resistor 3 and magnet 1.

In order to examine the actual detection sensitivity and resolution of the detector, we measured the output voltage of the magneto-resistor 3 when the magnet 1 is moved parallel to the magnetic body 2 while supplying a constant voltage of 5V to the magneto-resistor 3, with the gap between the magnetic body 2 and magnet 1 changed between 4 and 14 mm.

Figure 2:
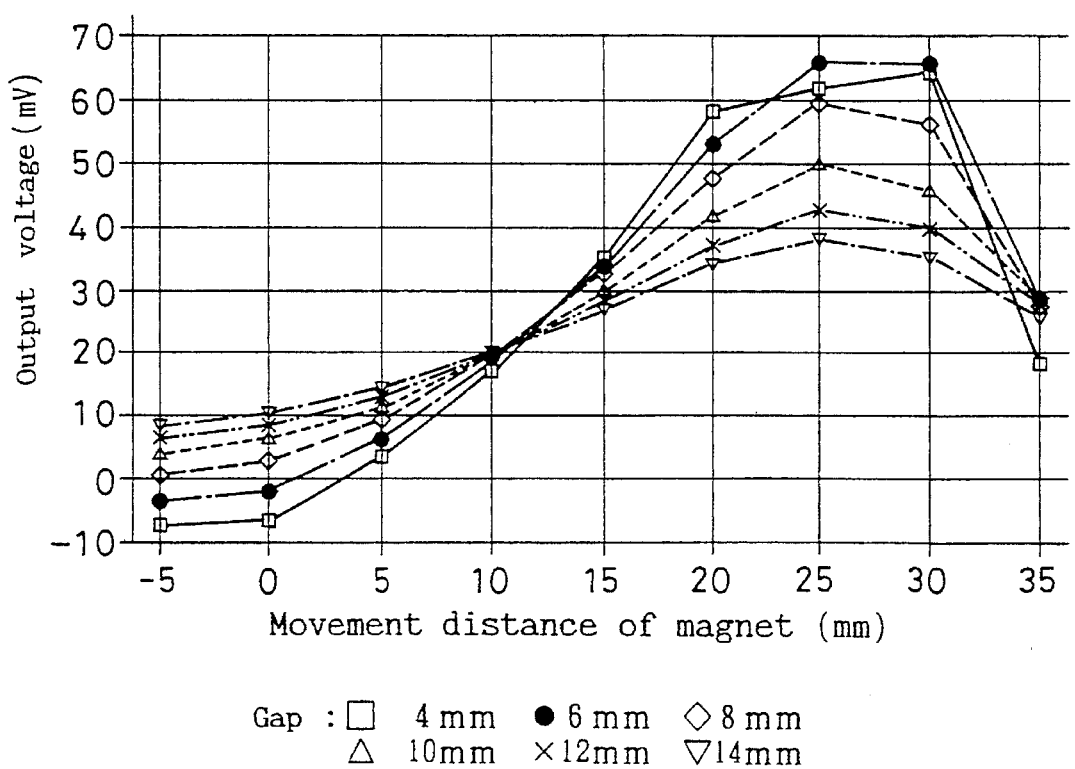
FIG. 2 is a graph showing the relationship between the movement of the magnet and the output voltage in the first embodiment.

The results are shown in FIG. 2.

The output voltage curves shown in FIG. 2 clearly show that the output voltage tends to increase linearly as the magnet 1 moves close to the magneto-resistor 3, irrespective of the size of the gap.

This figure also shows that the gradient of the graph is inversely proportional to the size of the gap. Namely, the smaller the gap, the larger the gradient. Thus, it is possible to achieve high resolution of the detector by adjusting the size of the gap.

Thus, this detector can detect the direction and amount of movement of the magnet 1 relative to the magnetic body 2.

Negative output voltages are produced because the magneto-resistor 3 is bridge-connected and thus the polarity is reversed when the direction of the magnetic field changes.

Figure 3:
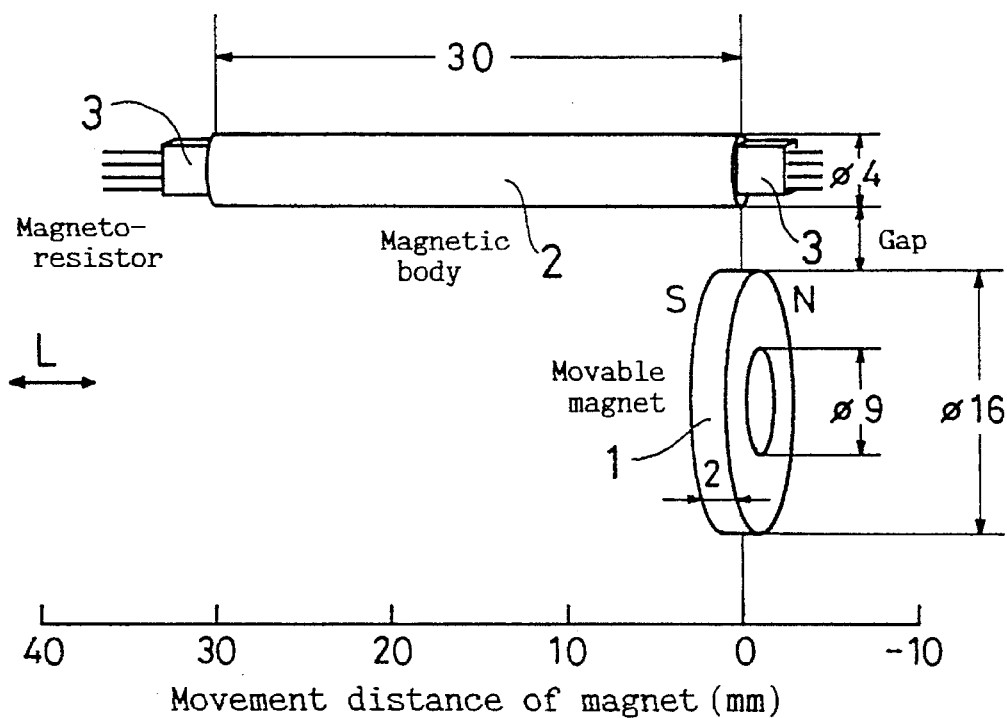
FIG. 3 is a schematic view of a second embodiment.

FIG. 3 shows the second embodiment.

In the second embodiment, magneto-resistors 3 are attached to both ends of the magnetic body 2 of the first embodiment to produce differential outputs.

Figure 4:
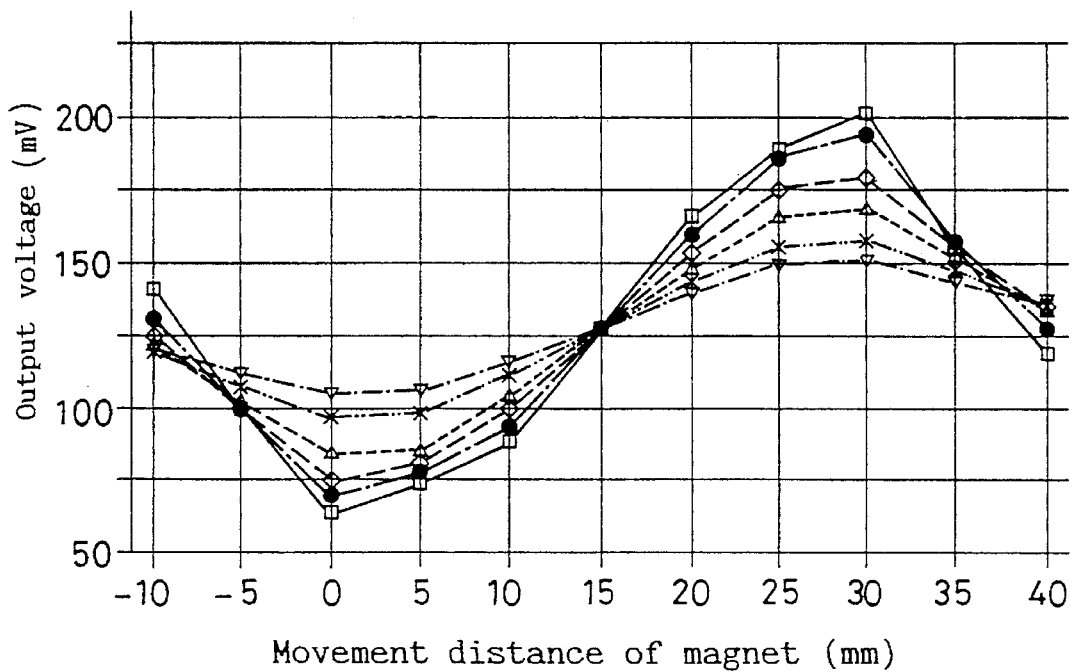
FIG. 4 is a graph showing the relationship between the movement of the magnet and the output voltage in the second embodiment.

The output voltage was measured under the same conditions as in the first embodiment. The results are shown in FIG. 4.

In this case, the output voltages obtained were about twice those obtained in the first embodiment, because they are differential outputs. Thus, the linearity improved markedly.

Figure 5:
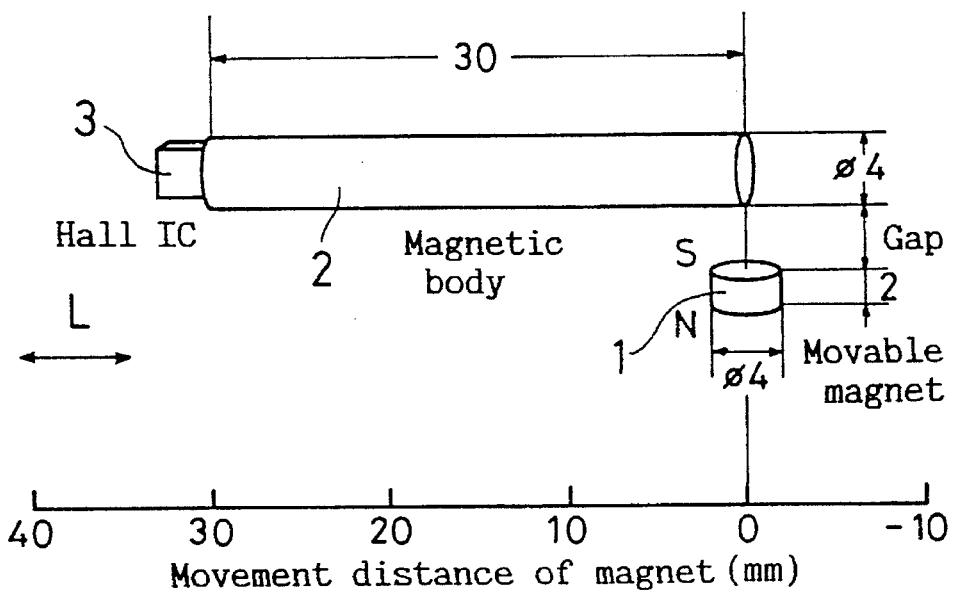
FIG. 5 is a schematic view of a third embodiment.

FIG. 5 shows the third embodiment in which we used a 4-mm diameter cylindrical magnet 1 which is polarized in a direction perpendicular to the direction of the path L so that magnetic fluxes are produced at a right angle relative to the magnetic body 2.

Also, in order to improve the linearity and increase the sensitivity, we used a Hall element as the magnetically sensitive element 3. It was arranged so that its detection surface was in contact with one end face of the magnetic body 2.

Figure 6:
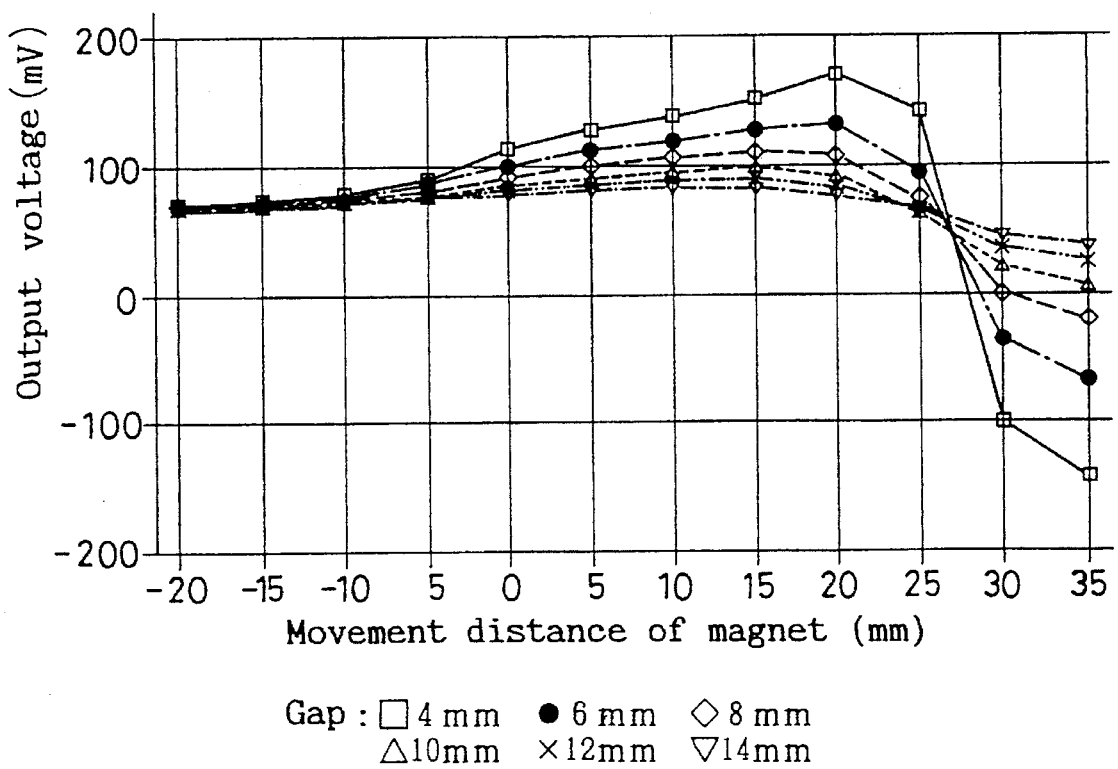
FIG. 6 is a graph showing the relationship between the movement of the magnet and the output voltage in the third embodiment.

The output voltage was measured under the same conditions as in the first embodiment. The results are shown in FIG. 6.

In this case, since the magnetic poles are arranged perpendicular to the path L, there are fewer magnetic fluxes parallel to the path, which can be focused by the magnetic body 2. Thus, if the gap is relatively large, the output voltage curve tends to be substantially flat with little change in output voltage. But if the gap is sufficiently narrow so that the magnet 1 is located close to the magnetic body 2, the output voltage changes markedly.

Thus, this device can be used as a movement distance detector by suitably adjusting the size of the gap.

Figure 7:
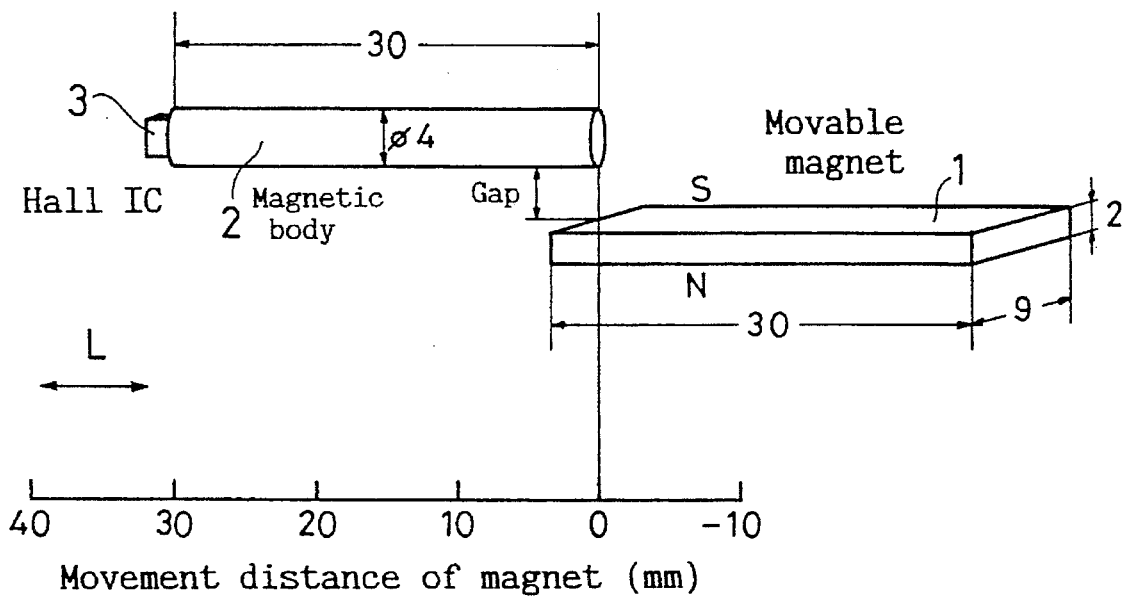
FIG. 7 is a schematic view of a fourth embodiment.

FIG. 7 shows the fourth embodiment.

The magnet 1 of the fourth embodiment has a length equal to the travel distance of the magnet 1 (30 mm long, 9 mm wide and 2 mm thick). The magnet is polarized vertically as in the third embodiment.

Figure 8:
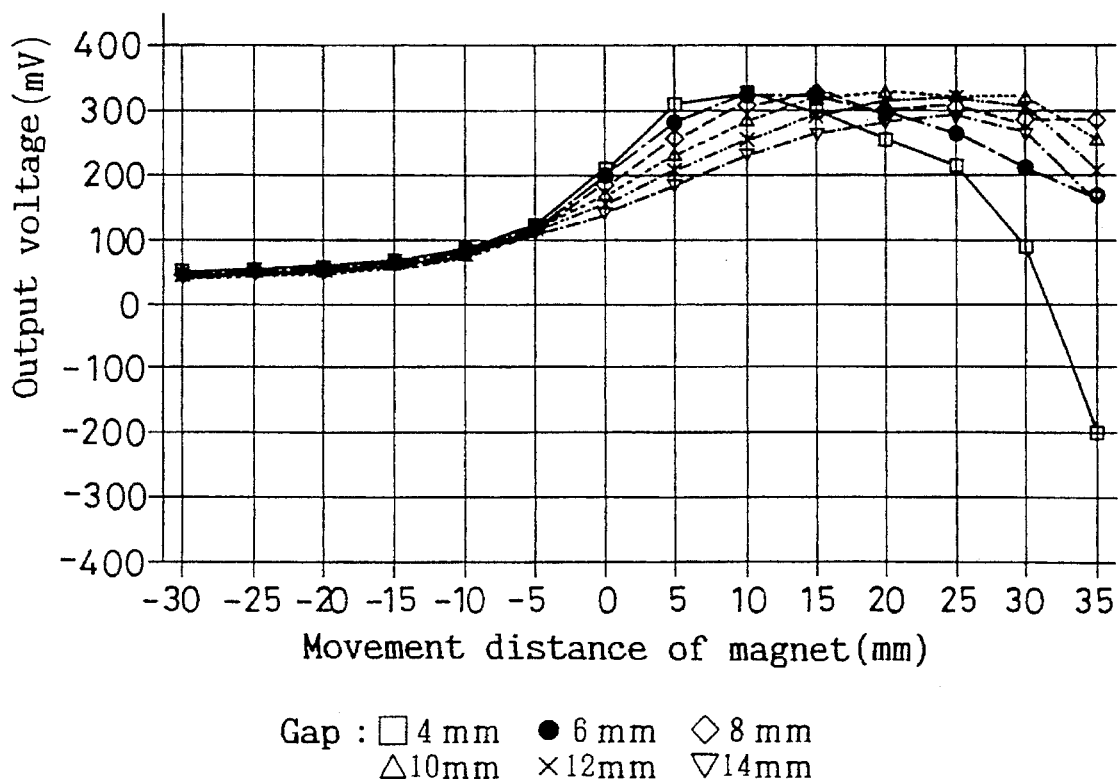
FIG. 8 is a graph showing the relationship between the movement of the magnet and the output voltage in the fourth embodiment.

The output voltage was measured under the same conditions as in the first embodiment. The results are shown in FIG. 8.

In this case, the number of magnetic fluxes focused by the magnetic body 2 increases and decreases according to the area of the part where the magnet 1 overlaps the magnetic body 2. Thus, the output voltage changes with the movement of the magnet 1.

For the above reason, the detected magnetic flux density changed more widely and thus larger outputs were obtained in this embodiment than in the third embodiment.

Such a device can be used e.g. as an ON-OFF sensor for detecting whether or not the magnet 1 has come closer than a predetermined point.

Figure 9:
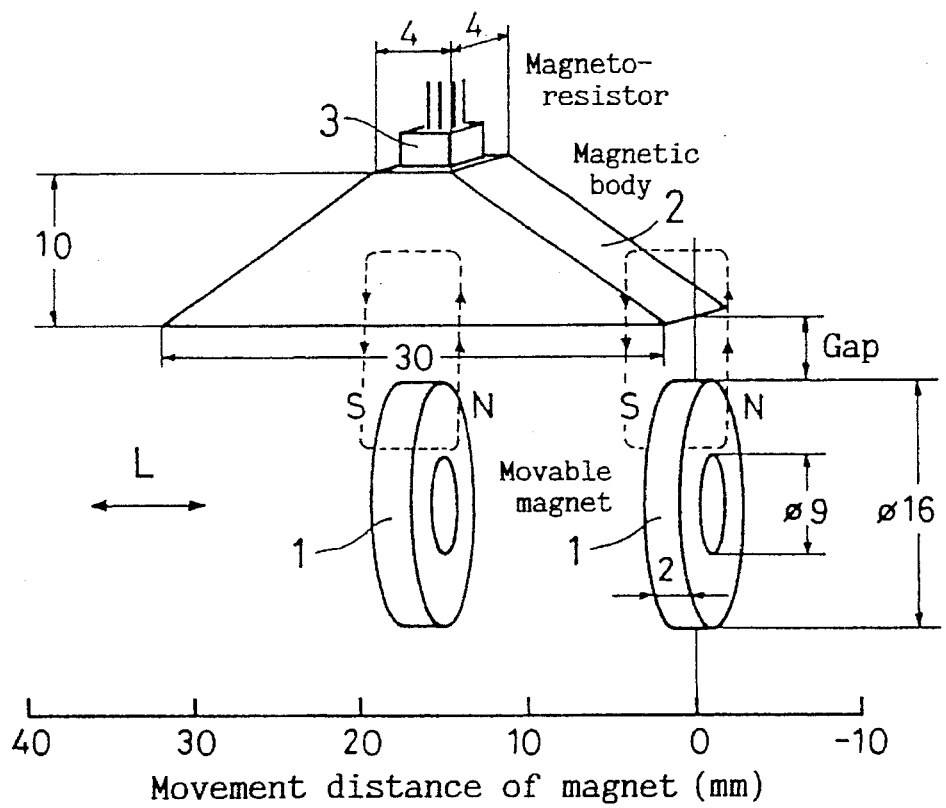
FIG. 9 is a schematic view of a fifth embodiment.

FIG. 9 shows the fifth embodiment in which the magnet 1 is the same ring magnet as used in the first embodiment. The magnetic body 2 has the shape of a truncated pyramid having a bottom surface (4 mm by 30 mm) located opposite the magnet 1. A magneto-resistor 3 is mounted on the top surface (4 mm by 4 mm) of the truncated pyramid.

Thus, in this embodiment, the direction in which the magneto-resistor 3 detects the magnetic field is normal to the path L.

Figure 10:
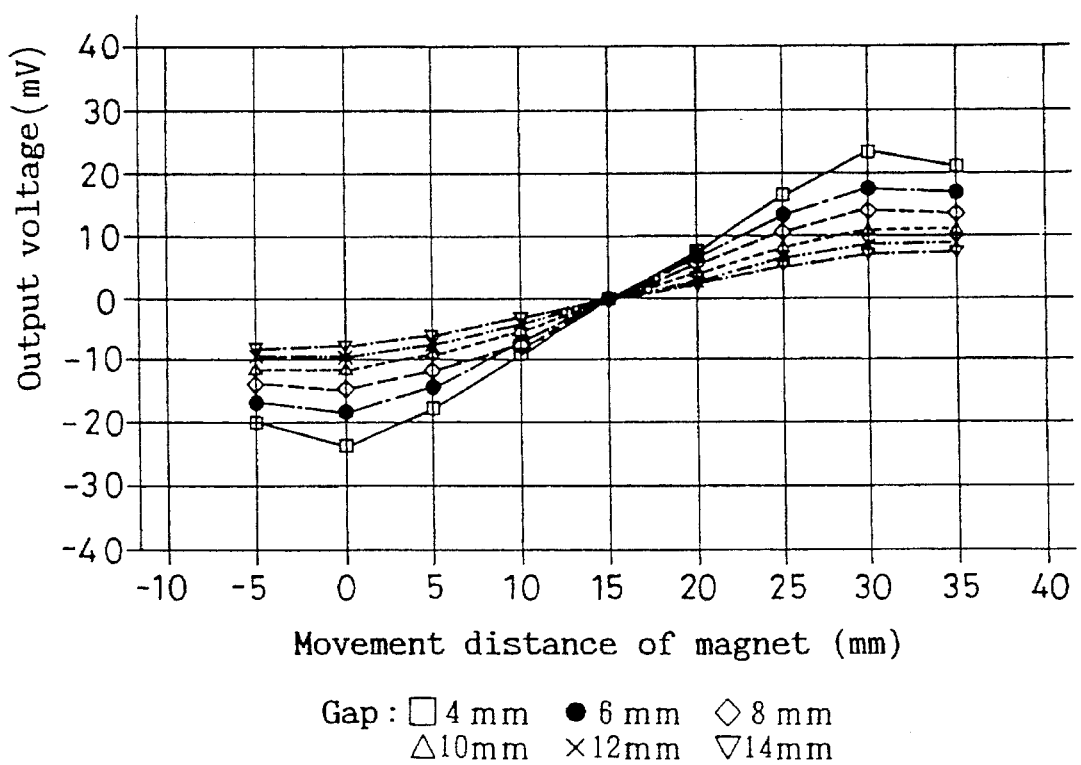
FIG. 10 is a graph showing the relationship between the movement of the magnet and the output voltage in the fifth embodiment.

We measured the output voltage under the same conditions as in the first embodiment. The results are shown in FIG. 10.

In this case, the detected outputs were much more linear than those obtained in the other embodiments.

This presumably results from the shape of the magnetic body 2. Namely, since the magnetic body is truncated pyramid-shaped, the magnetic fluxes of the magnet 1, which are focused on the bottom surface of the truncated pyramid, are guided to the top surface and detected by the magneto-resistor 3.

Since the magneto-resistor 3 detects the magnetic fluxes extending perpendicular to the path L, it detects the flux in one direction while the magnet 1 is located at one end of the bottom surface of the magnetic body 2, as shown by chain line in FIG. 9.

At the central portion, the resistor 3 detects the fluxes in both directions. Thus, the output will be zero in this state because the fluxes in opposite directions negate each other.

While the magnet is located somewhere between the central portion and either end of the magnetic body, the resistor 3 gives an output equal to the difference between the fluxes in one direction and those in the opposite direction. Thus, favorable detection properties as shown in FIG. 10 are obtainable.

Namely, the amount of movement of the magnet relative to the magnetic body can be detected with high accuracy.

Figure 11:
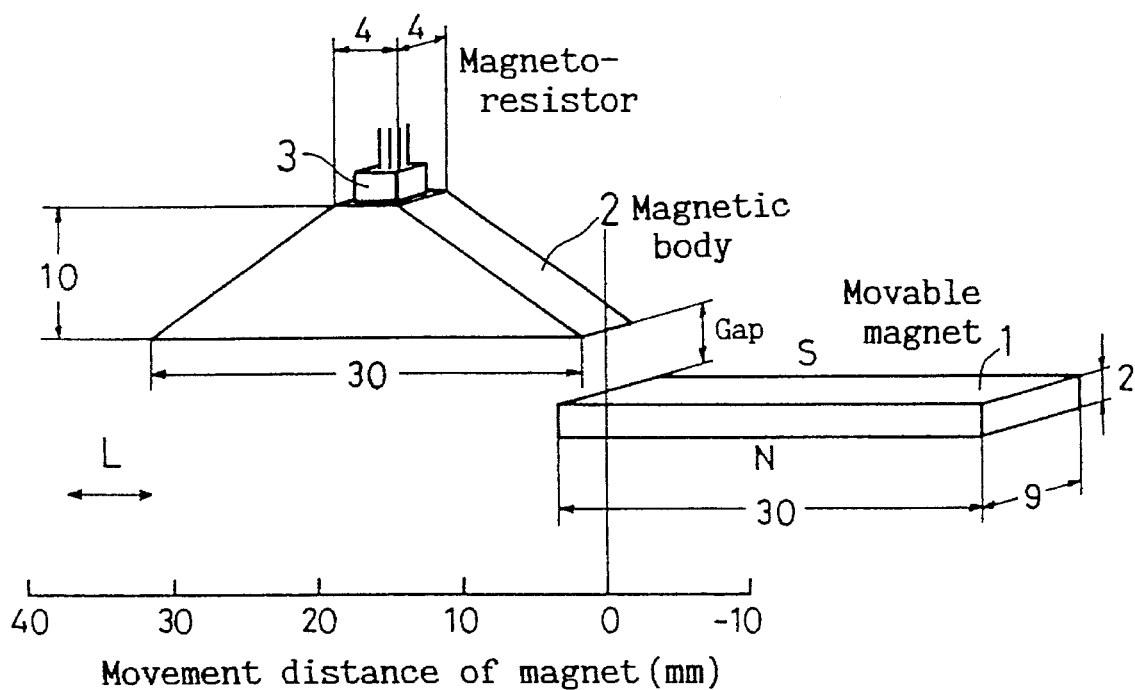
FIG. 11 is a schematic view of a sixth embodiment.

FIG. 11 shows the sixth embodiment in which the magnet 1 is a plate-shaped magnet 1 (9 mm wide, 30 mm long and 2 mm thick) which is polarized in a direction perpendicular to the path L and movable by the distance equal to its length.

Figure 12:
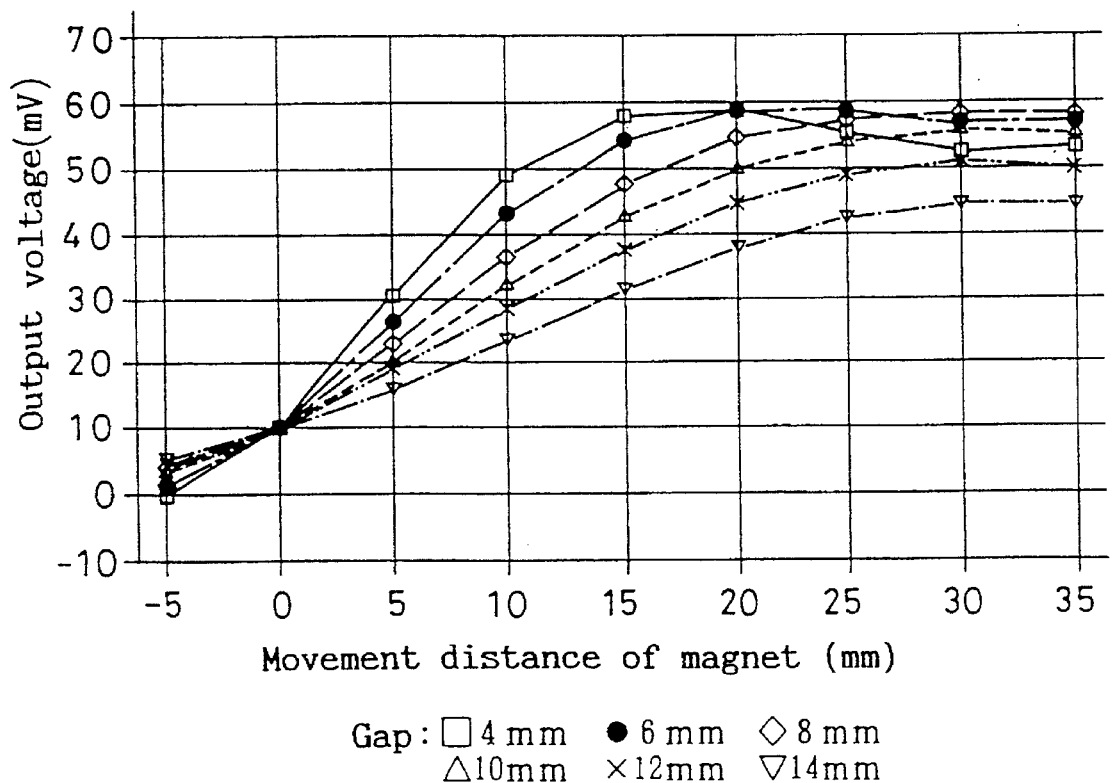
FIG. 12 is a graph showing the relationship between the movement of the magnet and the output voltage in the sixth embodiment.

FIG. 12 shows change in the output of the magneto-resistor 3 relative to the movement of the magnet 1, as measured under the same conditions as in the first embodiment.

In this case, the output increases linearly from the position at which the front end of the magnet 1 aligns with one end of the magnetic body 2.

This is because the fluxes of the magnet 1 at its portion overlapping the magnetic body 2 are focused by the magnetic body 2 and detected by the magneto-resistor 3. Namely, the output changes with the magnetic flux density, which in turn changes with the area of the portion of the magnet 1 overlapping the magnetic body 2 and thus the amount of movement of the magnet 1.

Figure 13:
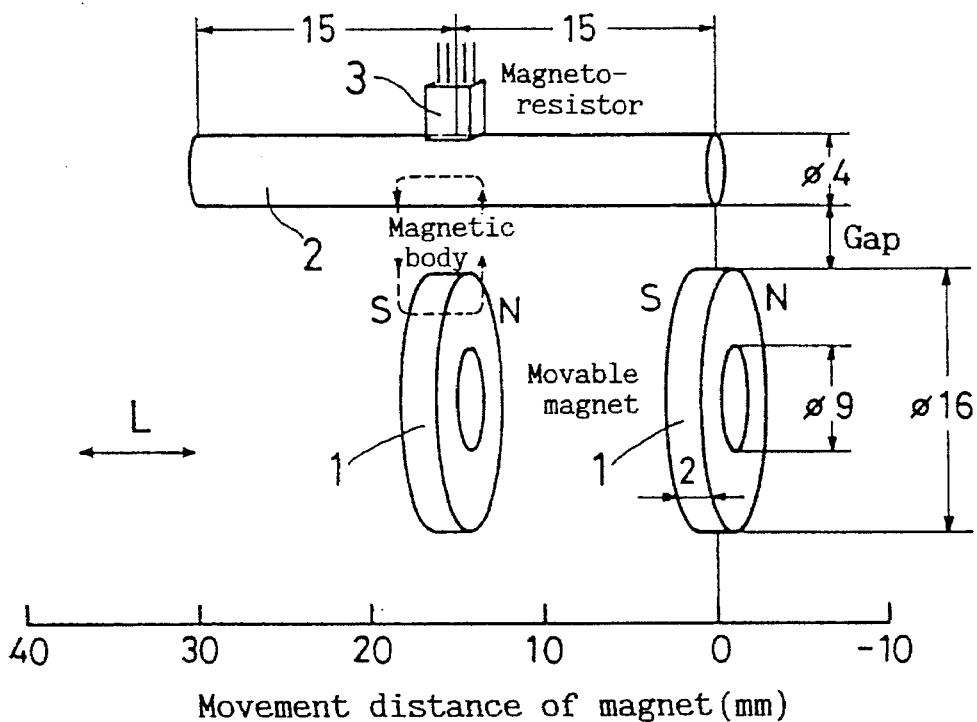
FIG. 13 is a schematic view of a seventh embodiment.

FIG. 13 shows the seventh embodiment.

The magnet 1 used in the seventh embodiment is the same ring magnet as used in the fifth embodiment, whereas the magnetic body 2 is rod-shaped. A magneto-resistor 3 is mounted on the magnetic body 2 at its center on the side remote from the magnet 1. In order to compare the difference in outputs between the truncated pyramid-shaped magnetic body 2 of the fifth embodiment and the rod-shaped magnetic body 2 of this embodiment, we measured the output voltages obtained in this embodiment under the same conditions as in the first embodiment.

Figure 14:
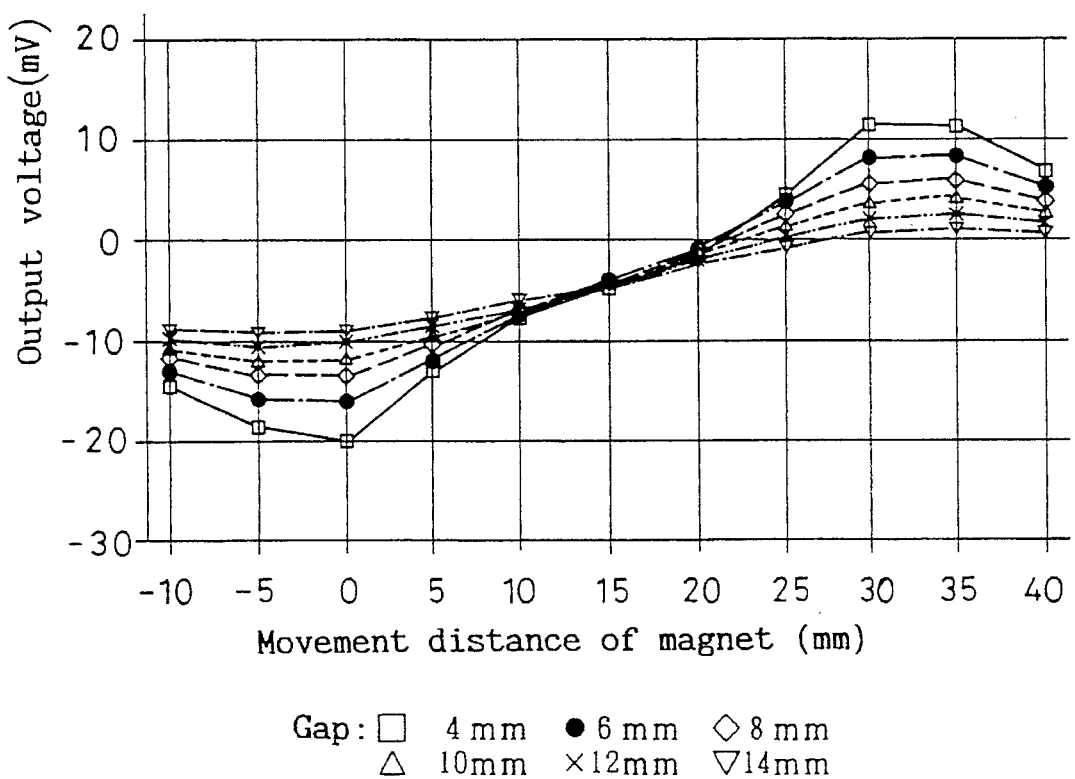
FIG. 14 is a graph showing the relationship between the movement of the magnet and the output voltage in the seventh embodiment.

The results are shown in FIG. 14.

In this case, the output level was about half the output obtained in the fifth embodiment and also the linearity was substantially lower. This shows that the fifth embodiment is thus preferable.

According to the present invention, by using a magnetic body 2 having a simple shape such as a rod or a truncated pyramid in combination with a magnet 1, the relative position therebetween can be detected with degree of accuracy high resolution.

Thus, the relative position between two objects can be detected with high accuracy by attaching the magnet 1 to one of the objects and the magnetic body 2 to the other. Such a movement distance detector can be manufactured easily at low cost.

By adjusting the direction of polarity of the magnet 1, it is possible to detect the relative position between two objects irrespective of the size of the gap therebetween. Thus, high assembling accuracy is not required.

The detector of the present invention can detect the relative position between the magnet and the magnetic body with equal accuracy, irrespective of whether the magnetic body is mounted on a moving member or a fixed member.

In the embodiments, we used a magneto-resistor or other types may be used provided the output changes with. But it may be any other type provided its output changes with the intensity of the magnetic field detected.

It is preferable to detect the magnetic field in the direction specified in the description of each embodiment. But if necessary, this direction may be inclined slightly provided that the output level will not unduly decrease the minimum detectable movement remains relatively small.

FIGS. 15A and 15B show the eighth embodiment. Numeral 1 designates a ring-shaped magnet which measures e.g. 16 mm in outer diameter, 9 mm in inner diameter and 2 mm thick. It is made of a rare earth element. Its north and south poles are arranged parallel to the direction in which the magnet is moved.

Numeral 2 designates a rod-shaped magnetic body for transmitting magnetism. It is made of a magnetic soft iron and measures 6 mm in outer diameter and 30 mm in length. Also, its end portion, about one-third of the entire length, is tapered so that the outer diameter decreases to 4 mm at its narrow end. A magnetically sensitive element 3 in the form of MR element (magneto-resistor) is secured to the non-tapered end of the magnetic body 2.

In this embodiment, the rod-shaped magnetic body 2 is fixed to a fixed member, while the magnet 1 is secured to an object whose movement is to be measured. As the magnet 1 is moved toward the magnetic body 2 keeping concentricity relative to the magnetic body 2 so as to fit on the magnetic body, the magnetically sensitive element 3 secured to the magnetic body 2 will produce magnetic signals. The signals are sent to a signal processing circuit (not shown), in which they are converted into voltage signals and amplified. The movement distance of the object is thus detected.

FIGS. 16A and 16B show the ninth embodiment. Magnet 4 is a small disk 6 mm in outer diameter and 2 mm thick. It is made of a rare earth element. Magnetic body 5 for transmitting magnetism is made of a magnetic soft iron and has an outer diameter or 14 mm and a maximum inner diameter of 10 mm at its end. Its portion extending from this end by about one-third of the entire length is tapered. The remaining non-tapered portion has an inner diameter of 8 mm. The non-tapered inner peripheral surface is 30 mm long. The magnetically sensitive element 6 is a Hall IC which is attached to the closed end of the magnetic body 5.

In the ninth embodiment, the cylindrical magnetic body 5 is fixed to a fixed member, while the magnet 4 is secured to an object whose movement is to be measured. The magnet 4 is moved into the magnetic body 5 while keeping concentricity relative to the magnetic body 5.

As the magnet 4 is moved into the magnetic body 5, the magnetically sensitive element 6 secured to the magnetic body 5 will produce magnetic signals. They are sent to a signal processing circuit in which they are converted into voltage signals and amplified. The movement distance of the object is thus detected.

With either of the embodiments, it is possible to detect a linear movement of more than 20 mm.

Alternately, the rod-shaped or cylindrical magnetic body may be secured to an object whose movement is to be measured while the magnet is fixed in position. The magnetic member may be formed from permalloy or any other soft magnetic material. The magnet may be of a ferrite or alnico magnet.

In the eighth and ninth embodiments, the tapered surface of the rod-shaped or cylindrical magnetic body is initially located proximate to the magnet. The distance between the magnet and the magnetic body when they move relative to each other can be detected with a high degree of accuracy. This makes it easy to correct any non-linearity of the detector output.

Further, even if the ring-shaped magnet should turn about its axis, the relative position between the magnet and the magnetic body remains unchanged. If the axis of the magnet should be slightly out of alignment with the axis of the magnetic body, there will be a portion of the output where the distance between the magnet and the magnetic body appears short and a portion of the output where such a distance appears longer. Thus, the outputs will be counteracted so that the net output will change little.

What is claimed is:

1. A movement distance detector comprising:

a magnet movable along a path and having poles arranged parallel to the path;

a magnetic body having the shape of a truncated pyramid having a top portion and a bottom portion, wherein said bottom portion of said truncated pyramid extends parallel to the path; and a magnetically sensitive element mounted on said top portion of said truncated pyramid.

2. A movement distance detector comprising:

a truncated pyramid-shaped magnetic body;

a magnet movable along a path for a maximum relative travel distance between said magnet and said magnetic body, said magnet having magnetic poles positioned in relation to the path;

said truncated pyramid-shaped magnetic body having a bottom portion extending along the path and located proximate said magnet, wherein said magnet is movable relative to said magnetic body; and a magnetically sensitive element mounted on said magnetic body.

3. The movement distance detector as claimed in claim 2, wherein said truncated pyramid-shaped magnetic body includes a top portion and said magnetically sensitive element is mounted on said top portion of said truncated pyramid-shaped magnetic body.

4. The movement distance detector as claimed in claim 2, wherein said bottom portion of said truncated pyramid-shaped magnetic body and said magnet are spaced by a predetermined gap during travel along the path.

5. The movement distance detector as claimed in claim 2, wherein said magnetic poles of said magnet are arranged parallel to the path, 6. The movement distance detector as claimed in claim 2, wherein said magnetic poles of said magnet are arranged perpendicular to the path.

7. The movement distance detector as claimed in claim 6, wherein said magnet has a length substantially equal to the maximum relative travel distance between said magnet and said magnetic body.

* * * * *